United States Patent
Yang et al.

(10) Patent No.: US 7,430,315 B2
(45) Date of Patent: Sep. 30, 2008

(54) FACE RECOGNITION SYSTEM

(75) Inventors: Ming-Hsuan Yang, Sunnyvale, CA (US); Jongwoo Lim, San Diego, CA (US); David Ross, Toronto (CA); Takahiro Ohashi, Sailtama (JP)

(73) Assignee: Honda Motor Co., Tokyo (JP)

( * ) Notice: Subject to any disclaimer, the term of this patent is extended or adjusted under 35 U.S.C. 154(b) by 440 days.

(21) Appl. No.: 10/858,930

(22) Filed: Jun. 1, 2004

(65) Prior Publication Data
US 2005/0180627 A1    Aug. 18, 2005

Related U.S. Application Data

(60) Provisional application No. 60/544,576, filed on Feb. 13, 2004.

(51) Int. Cl.
G06K 9/62 (2006.01)
G06K 9/64 (2006.01)
G06K 9/40 (2006.01)

(52) U.S. Cl. .................. 382/159; 382/279; 382/264

(58) Field of Classification Search .............. 382/159, 382/279, 264
See application file for complete search history.

(56) References Cited

U.S. PATENT DOCUMENTS

| | | | |
|---|---|---|---|
| 5,710,833 | A | 1/1998 | Moghaddam et al. |
| 6,609,093 | B1 | 8/2003 | Gopinath et al. |
| 2004/0122675 | A1 * | 6/2004 | Nefian et al. ............. 704/276 |

OTHER PUBLICATIONS

Edgar Osuna, Training Support Vector Machines: an Application to Face Detection, 1997, IEEE, 1063-6919, 130-136.*

Chengjun Liu, Robust Coding Schemes for Indexing and Retrieval from Large Face Databases, Jan. 2000, IEEE, 1057-7149, 132-137.*

Belhumeur, Peter N. et al., *Eigenfaces vs. Fisherfaces: Recognition Using Class Specific Linear Projection*, IEEE Transactions on Pattern Analysis and Machine Intelligence (Jul. 1997), vol. 19, No. 7, pp. 711-720.

(Continued)

*Primary Examiner*—Bhavesh M. Mehta
*Assistant Examiner*—Jonathan Schaffer
(74) *Attorney, Agent, or Firm*—Fenwick & West LLP; Mark Duell

(57) ABSTRACT

The face detection system and method attempts classification of a test image before performing all of the kernel evaluations. Many subimages are not faces and should be relatively easy to identify as such. Thus, the SVM classifier try to discard non-face images using as few kernel evaluations as possible using a cascade SVM classification. In the first stage, a score is computed for the first two support vectors, and the score is compared to a threshold. If the score is below the threshold value, the subimage is classified as not a face. If the score is above the threshold value, the cascade SVM classification function continues to apply more complicated decision rules, each time doubling the number of kernel evaluations, classifying the image as a non-face (and thus terminating the process) as soon as the test image fails to satisfy one of the decision rules. Finally, if the subimage has satisfied all intermediary decision rules, and has now reached the point at which all support vectors must be considered, the original decision function is applied. Satisfying this final rule, and all intermediary rules, is the only way for a test image to garner a positive (face) classification.

36 Claims, 8 Drawing Sheets

OTHER PUBLICATIONS

Osuna, E. et al., *Training Support Vector Machines: an Application to Face Detection*, Computer Vision and Pattern Recognition, 1997, pp. 130-136.

Vapnik, V. N., *The Nature of Statistical Learning Theory*, Springer-Verlag New York, Inc., 1995, pp. 133-156.

* cited by examiner

FACE RECOGNITION SYSTEM

RELATED APPLICATIONS

This application claims the benefit of the U.S. Provisional Patent Application No. 60/544,576, filed Feb. 13, 2004 which is incorporated by reference in its entirety.

This application is related to co-pending U.S. patent application Ser. No. 10/858,878, filed on Jun. 1, 2004 and entitled "Method, Apparatus and Program for Detecting an Object,", and to U.S. patent application Ser. No. 10/621,872 filed on Jul. 16, 2003, which are both incorporated by reference herein in their entirety.

BACKGROUND OF THE INVENTION

1. Field of the Invention

The present invention relates generally to image recognition and more specifically using Support Vector Machine classifiers for face detection and recognition.

2. Background of the Invention

Face detection and recognition systems have various applications such as intelligent human-computer interfaces, surveillance and monitoring systems, and content-based image search and retrieval using a face. However, previous attempts to develop efficient face detection and recognition systems were not successful because the computers and algorithms used in conventional face detection and recognition systems could not effectively handle the large amount of data and complicated computation inherently involved in a face recognition system.

Face detection has direct relevance to a face recognition system, because the first important step of face recognition is to define and locate faces in an arbitrary image. Several different techniques have been applied to the problem of face detection. These techniques include Neural Networks, detection of face features using geometrical constraints, density estimation of the training data, labeled graphs and clustering and distribution-based modeling. In general, face detection and recognition techniques are based on two main approaches, feature-based approaches and template-based approaches. In feature-based approaches, recognition is based on the detection of facial features, such as the eyes, nose, mouth corners, etc. The image analysis around these features and geometrical properties between these features are used in recognition. However, current methods for facial feature extraction are often not robust and exact enough to satisfy the demand of face recognition applications.

Template-based approaches generally represent faces directly by gray level image features or its transformation forms. Recognition methods can be based on similarity criteria such as minimum distance classification or Fisher's discriminant analysis. Recently, Support Vector Machine (SVM) techniques have been used in template-based approaches.

There exists a need for a more efficient face detection and recognition system for practical applications that requires less computational power.

SUMMARY OF THE INVENTION

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The present invention uses a cascade SVM classifier for face detection. The SVM classifier is trained with a third order polynomial kernel using face and non-face images. To speed up the test-time performance of the SVM, the face detection system and method first reduces the number of kernel evaluations performed for each subimage. In an embodiment, some support vectors are discarded. This results in increased speed, but with some in decrease accuracy. Each support vector has associated with it a coefficient, or alpha (a) value. Support vectors with very small alpha values have only a small affect on the classification of a test image. Consequently, the face detection system and method discards all support vectors with alphas below a certain threshold. This threshold is chosen such that the performance decrease on an independent test set of images is negligible.

The face detection system and method also attempts classification of a test image before performing all of the kernel evaluations. Many subimages are not faces. Thus, the SVM classifier attempts to discard non-face images using as few kernel evaluations as possible using a cascade SVM classification. In the first stage, a score is computed for the first two support vectors, and the score is compared to a threshold. If the score is below the threshold value, the subimage is classified as not a face. If the score is above the threshold value, the cascade SVM classification function continues to apply more complicated decision rules, each time doubling the number of kernel evaluations, classifying the image as a non-face (and thus terminating the process) as soon as the test image fails to satisfy one of the decision rules.

Finally, if the subimage has satisfied all intermediary decision rules, and has now reached the point at which all support vectors must be considered, the original decision function is applied. Satisfying this final rule, and all intermediary rules, is the only way for a test image to garner a positive (face) classification.

Once the face region has been detected, the system performs face recognition. In one embodiment, the face image is converted to grayscale, and normalized by subtracting the mean face image, and dividing each pixel by the standard deviation calculated from faces in the database. The Fisher coordinates are calculated for the test image. During initialization, the Fisher coordinates are calculated for each face image in the database. For each person, the mean of the Fisher coordinates, over all images of that person, is determined. Next, the Fisher coordinates of the test image are compared with the mean Fisher coordinates for each person in the database. The test image is classified as belonging to the person whose mean Fisher coordinates are closest (in Euclidean distance) to the test image.

BRIEF DESCRIPTIONS OF THE DRAWINGS

The invention has other advantages and features which will be more readily apparent from the following detailed description of the invention and the appended claims, when taken in conjunction with the accompanying drawings, in which:

Figure 5:
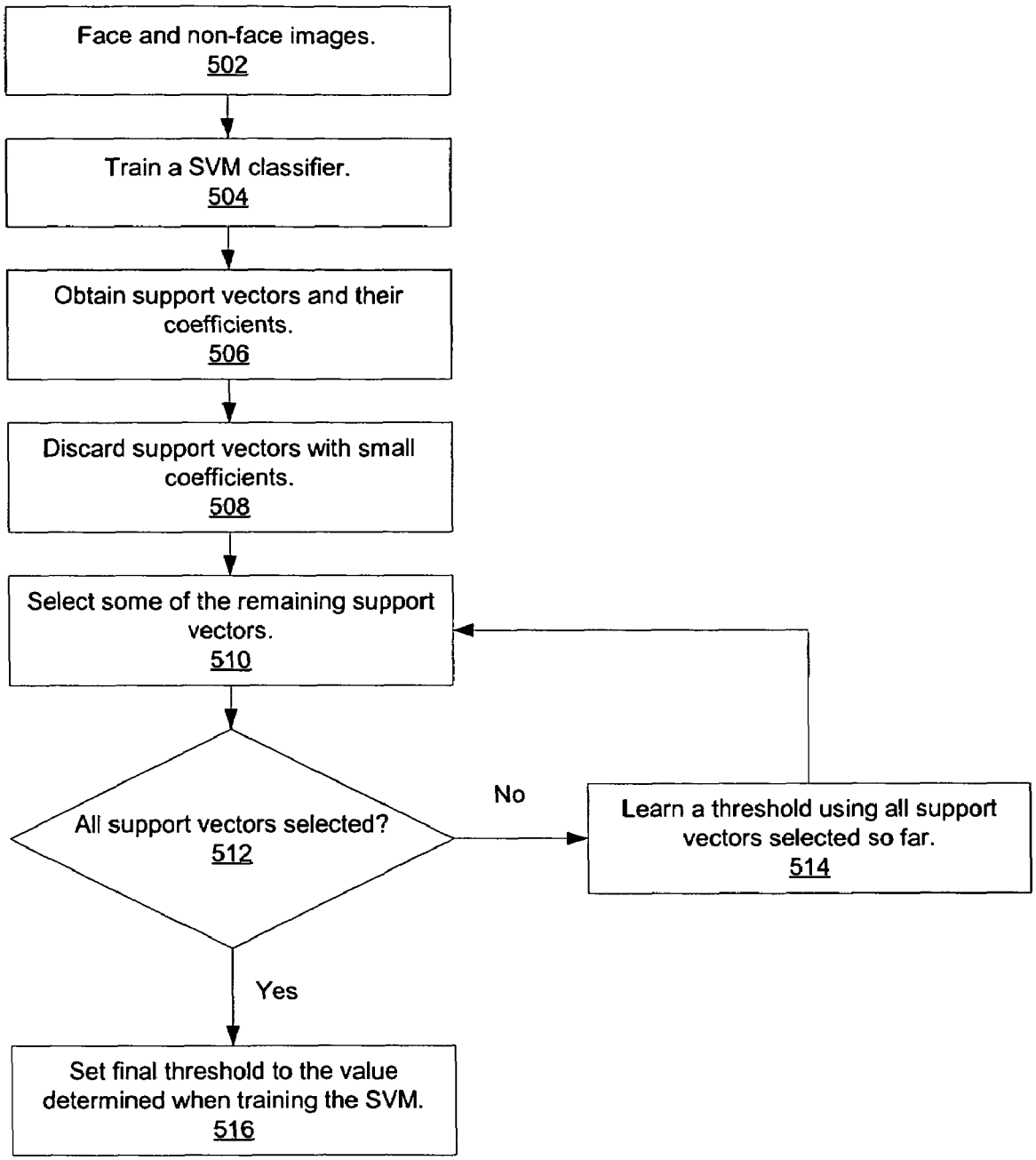

FIG. 5 a flow chart illustrating the steps for training a SVM classifier, according to an embodiment of the present invention.

Figure 6:
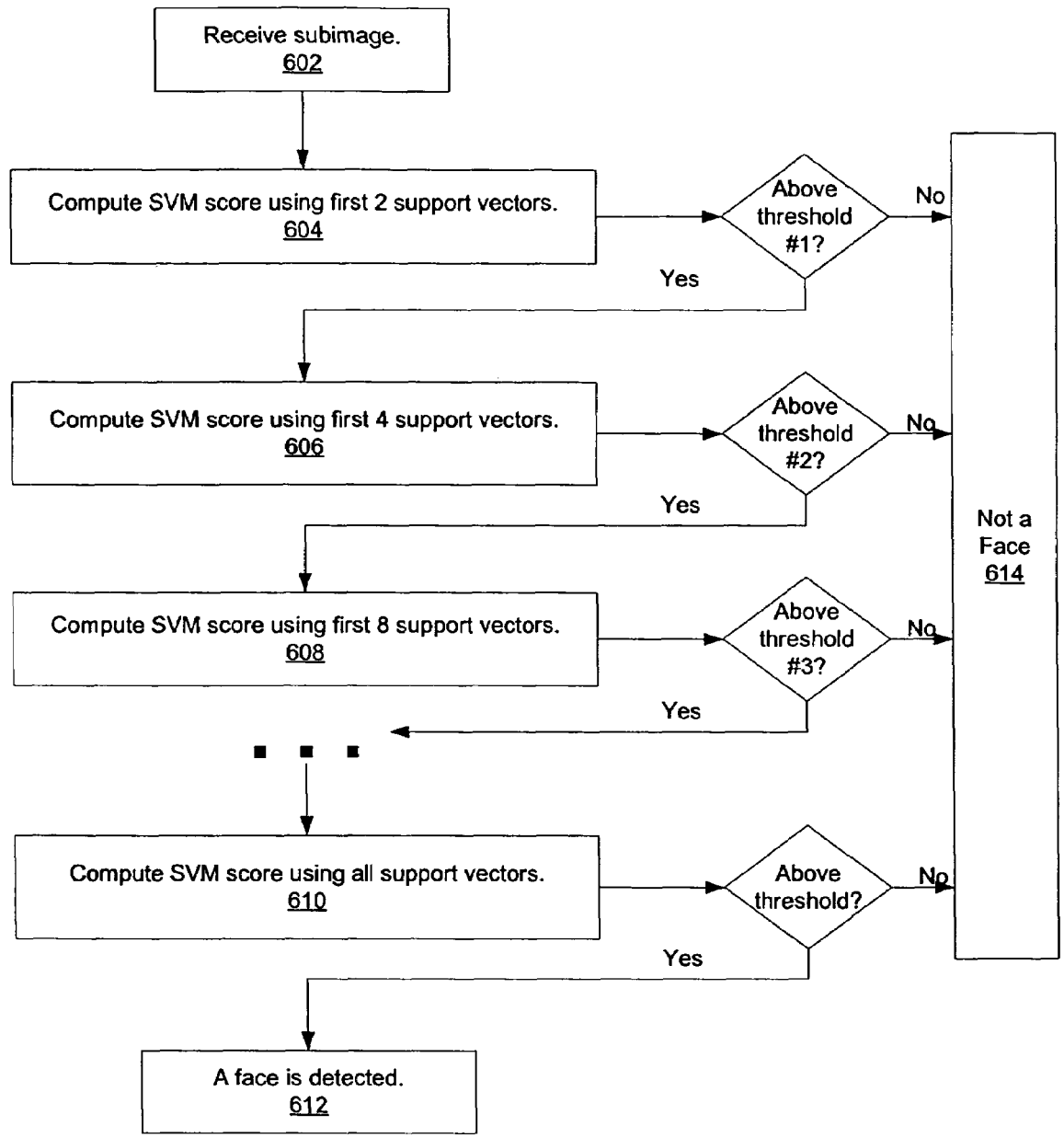

FIG. 6 a flow chart illustrating the steps for classifying a face in a cascade SVM classifier, according to an embodiment of the present invention.

Figure 7:
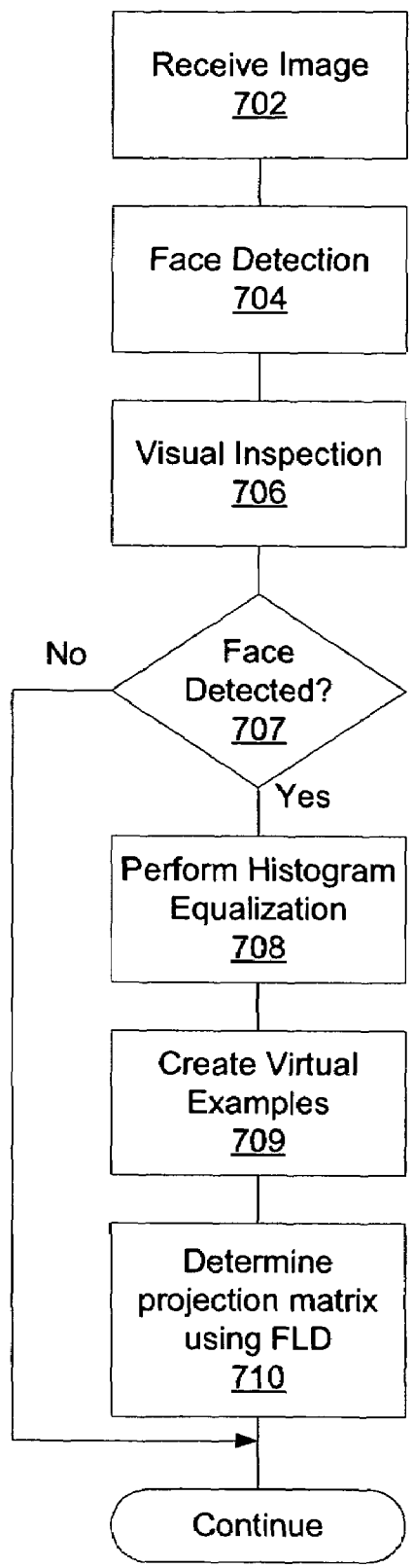

FIG. 7 is a flowchart illustrating the face recognition training procedure, according to one embodiment of the present invention.

Figure 8:
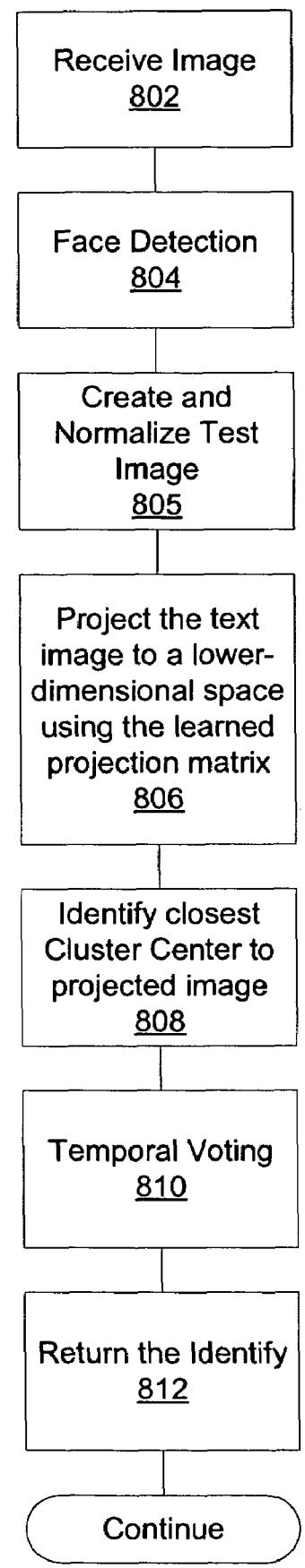

FIG. 8 is a flow chart illustrating a face recognition method, according to one embodiment of the present invention.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number typically corresponds to the figure in which the reference number is first used. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Face Recognition System

Figure 1:
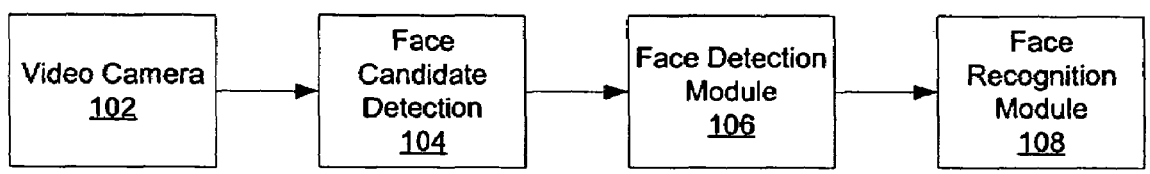
FIG. 1 is a block diagram illustrating a face recognition system, according to an embodiment of the present invention.

FIG. 1 is a functional block diagram illustrating a face recognition system 100 according to an embodiment of the present invention. The face recognition system 100 comprises a video source 102, a face candidate region detection module 104, a face detection module 106, and a face recognition module 108. The image source 102 provides one or more images to the face candidate region detection module 104. The face candidate region detection module 104 finds regions that are most likely to contain a face, using heuristics and a depth map. The face candidate region detection module 104 outputs a rectangular region consisting of "blobs" (i.e., contiguous regions) that is most likely to contain a face. The face detection module 106 performs face detection on the blob. If a face is detected, the face recognition module 108 determines the identity of the face from faces stored in a database.

Image Source

In an embodiment, the image source 102 comprises two or more video image captured by a video camera used to acquire the images of an object in order to determine face candidate regions. The two video cameras are used to determine the distance (from the focal planes of the cameras) to all objects specified by the two acquired images.

Face Candidate Region Detection

The image source 102 is coupled to the face candidate region detection module 104. The face candidate region detection module 104 finds the regions most likely to contain a face, using heuristics and a depth map obtain from using the image source 102 comprising two cameras for determining distance. The face recognition system 100 uses the face candidate region detection module 104 to find likely face regions in order to reduce the search space so that the face detection process will require less computational complexity, allowing the face detection process to be done in real time.

Figure 2:
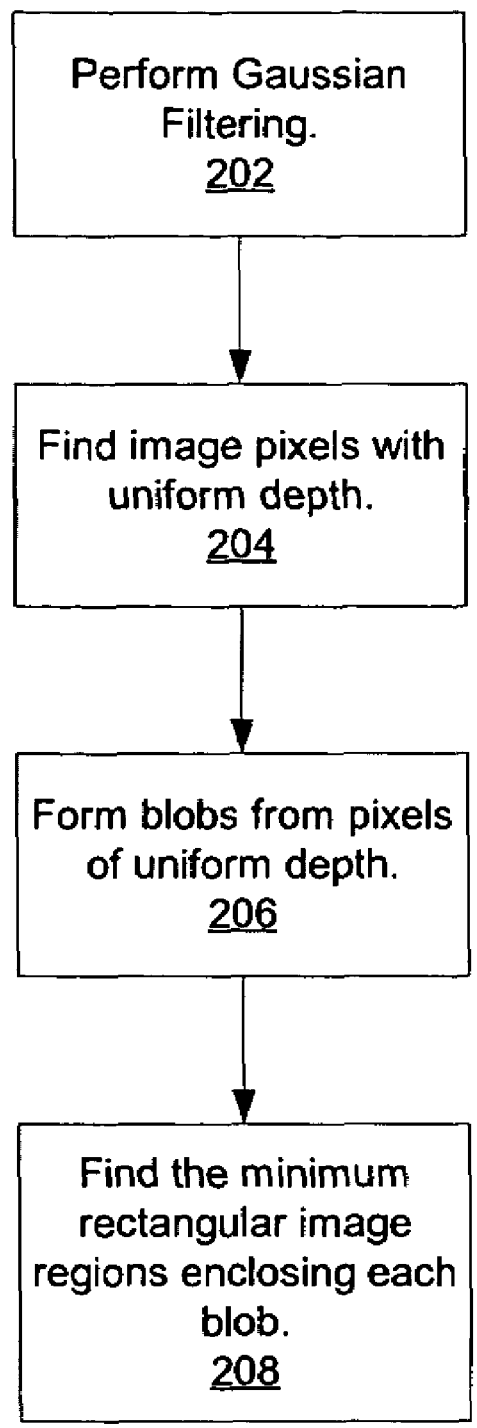
FIG. 2 is a flowchart illustrating a method for finding candidate face regions, according to an embodiment of the present invention.

FIG. 2 is a flowchart illustrating a method for finding candidate face regions, according to one embodiment of the present invention. The face candidate region detection module 104 finds candidate face regions by locating blob regions.

First, the face candidate region detection module 104 smooth the depth image obtained from the image source by convolving the image with a Gaussian filter, step 202. Then the region detection module 104 builds a histogram of the depth values, e.g., from 0.5 m to 3 m, consisting of 20 bins, step 204. The bin containing the largest number of pixels is selected. A binary image is created, based on whether or not each pixel belongs in the selected bins. Next, "blobs" (i.e., contiguous regions) are detected in the binary depth map image. If multiple blobs are found, these are merged into a single blob, step 206. A rectangle which encloses the blob is computed, step 208. The upper portion of this rectangle is used as the search region for face detection.

The above description of the face candidate region detection module 104 is provided for enablement and to explain the context in which the present invention preferably operates. The above description is an exemplary overview of functionality and structure. More detail on detecting an object region can be found in the co-pending U.S. patent application Ser. No. 10/858,878, filed on June 1, 2004 and entitled "Method, Apparatus and Program for Detecting an Object," which is incorporated herein by reference in its entirety.

Face Detection

Face detection is performed using a Support Vector Machine (SVM) classifier, which has been trained on sets of face and non-face images. Face detection involve taking in an arbitrary image such as a digitized video signal or a scanned photograph and determining whether or not there are any human faces in the image. If faces are found, the face detection module 106 returns an encoding of their location. A SVM classifier is used in the face detection module 106 to classify a face and non-face region.

Various algorithms can be used for the classification tasks. These classification algorithms include Neural Networks, Hidden Markov Classifiers, Fisher's Linear Discriminant Analysis and the Support Vector Machine. Any of these algorithms can be applied to classifying a face and non-face region. In the preferred embodiment of the present invention, the SVM classifier is applied. The SVM classifier is based on statistical learning theory, and it is a practical technique as it reduces to a quadratic programming problem with a unique solution.

SVM classifiers operate by identifying optimal features in order to improve division of a feature space by concentrating on the most important features. SVMs attempt to split the feature space into two distinct classes (here, a face class and a non-face class), via a hyperplane decision surface. A hyperplane is a geometrical surface with a variable dimensionality.

The SVM classifier aims to find the optimal differentiating hyperplane between the two classes. An optimal hyperplane is described as having optimal margins. This means the distance between classes is such that the margins are maximally separated between the classes. The vectors have to lie either on or outside the margin, and those vectors that lie exactly on the margin are the support vectors. The mathematical description of a hyperplane can be used as a function to discriminate vectors belonging to particular classes. The discrimination function returns a −1 or smaller for vectors on one side of the hyperplane, at the margin or beyond. On the other side of the hyperplane at the margin, the function returns a +1 or greater.

Given a set of training data, the basic idea of SVMs is to map the training data nonlinearly into a higher-dimensional feature space, and construct a separating hyperplane with a maximum margin in this feature space. Thus, an SVM implicitly transforms the given feature vectors $x$ into new vectors $\Phi(x)$ in a space with more dimensions, such that the hyperplane that separates the x becomes a hyperplane in the space of $\Phi(x)$'s. This mapping from x to $\Phi(x)$ is used implicitly in that only inner products of the form $K(x_i, x_j)=\Phi(x_i)^T\Phi(x_j)$ need ever to be computed, rather than the high dimensional vectors $\Phi(x)$ themselves. In these so-called kernels, the subscripts i, j refer to vectors in the training set. In the classification process, only the vectors that are very close to the separating hyperplane need to be considered when computing kernels. These vectors are called the support vectors (SV). Suppose that vector xi in the training set is given a label $y_i=1$ if it is a particular type of class (e.g., face) and $y_i=-1$ if it is not (e.g., a non-face). Then the optimal classifier has the form:

$$f(x) = \text{sign}\left(\sum_{i=1}^{l} \alpha_i y_i K(x, x_i) + b\right)$$

Where the summation is taken over the set of support vectors, and the constant $\alpha_i$ and i are computed by the classifier-learning algorithm. Computing the coefficients $\alpha_i$, b is a relatively expensive procedure, but needs to be performed only once, on the training set.

More detail on the SVMs can be found in V. N. Vapnik, *Statistical Learning Theory*, John Wiley & Sons, New York, 1998, which is incorporated herein by reference.

Figure 3:
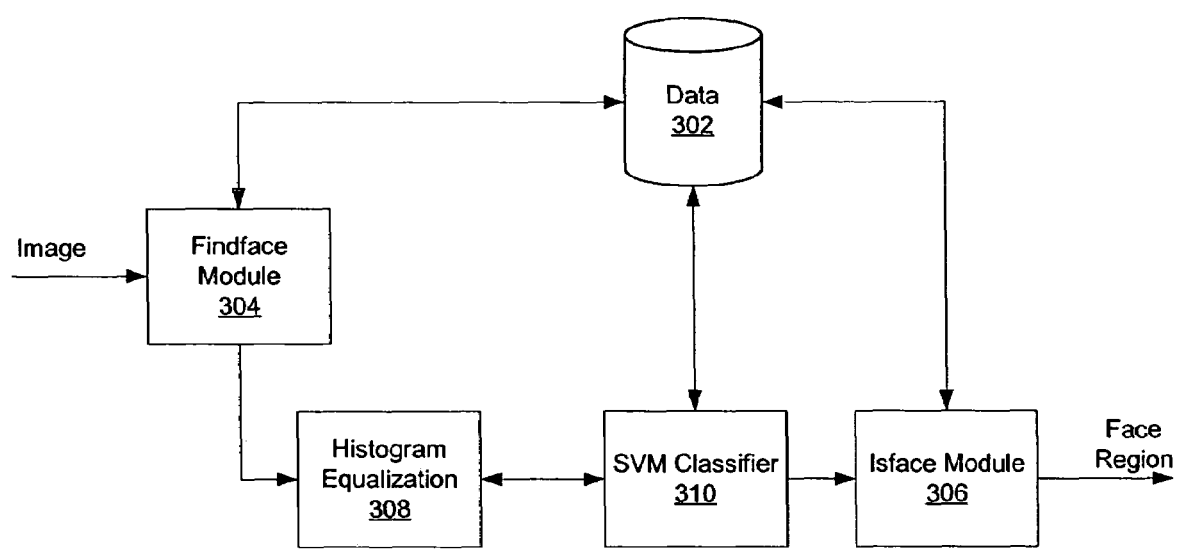
FIG. 3 is a function block diagram of a face detection system, according to an embodiment of the present invention.

FIG. 3 illustrates the components of the face detection module 106, according to one embodiment of the present invention. The face detection module 106 comprises a data storage module 302, Findface module 304, an Isface module 308, a histogram equalization module 308, and a SVM classifier module 310.

Figure 4:
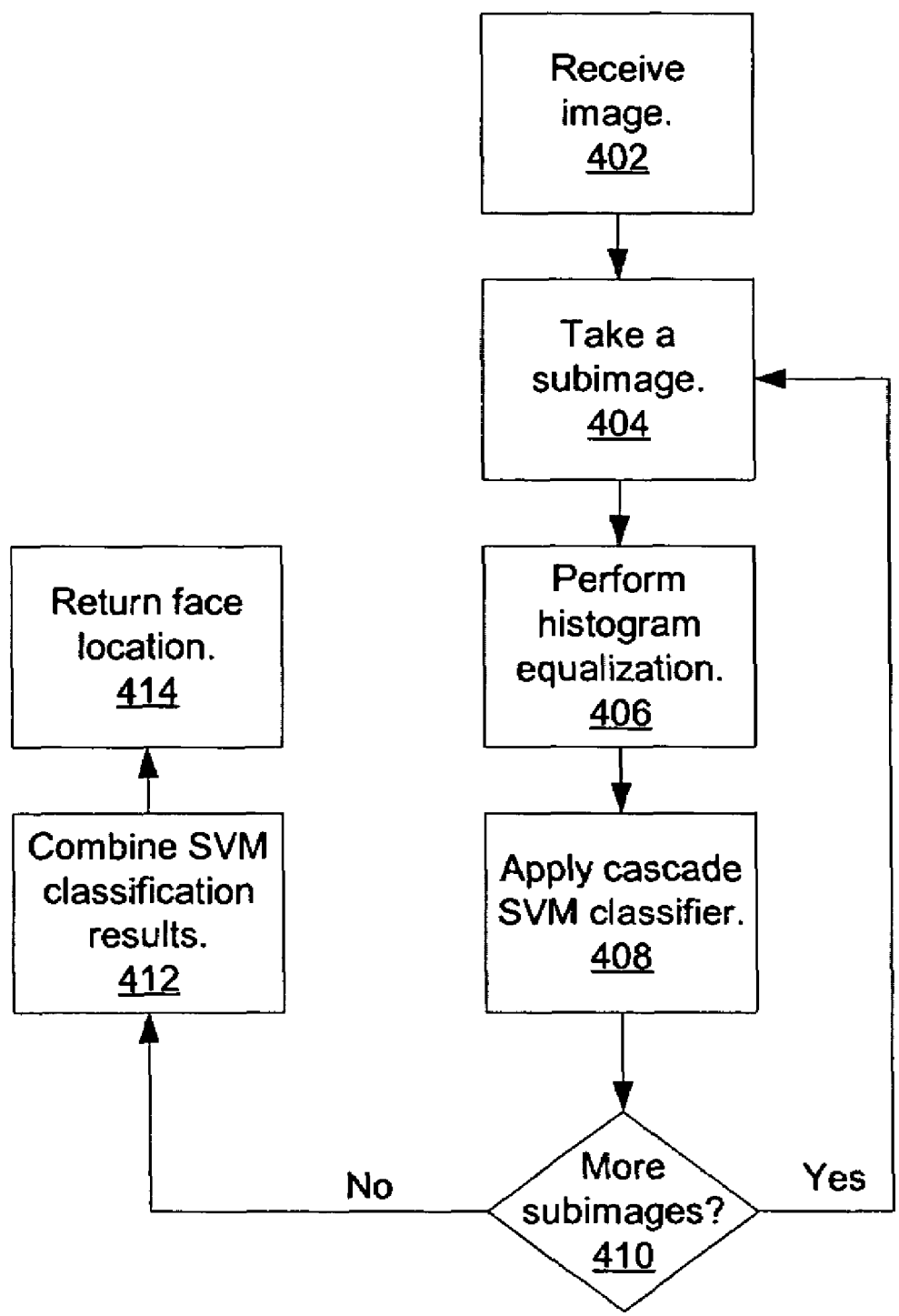
FIG. 4 is a flow chart illustrating the steps for detecting a face, according to an embodiment of the present invention.

FIG. 4 is a flowchart illustrating the steps for detecting a face using the face detection module 106. The face detection module 106 performs face detection using a Support Vector Machine classifier, which has been trained on sets of face and non-face images. A detail description on training SVM classifier will be provided below.

When the face detection module 106 receives an image, the Findface module 304 initiates face detection. In a preferred embodiment, the face detection module 106 receives an image passed from the face candidate region detection module 104. This image comprises a rectangular region containing blob regions that are most likely to contain a face. This rectangular region indicates the region of the image for the face detection module 106 to search for faces. The rectangular region provided by the face candidate region detection module 104 advantageously reduces the search area for faces, thus reducing the computational power. In an alternative embodiment, an entire image area can also be passed to the face detection module 106, in which case, the face detection module 106 will search the entire image for faces.

The Findface module 304 takes a sub-portion of the image (a subimage) to begin the search process, step 404. In a preferred embodiment, the Findface module 304 scans a 19×19 pixel window in the image. Next, the histogram equalization module 308 performs a histogram equalization over the 19×19 subimage in order to compensate for differences in illumination brightness, different camera response curves, etc., step 406. In step 408, the SVM classifier module 310 applies a cascade SVM classifier decision function to the 19×19 subimage window. If the subimage has a positive score, then a face has been found. If the subimage has a negative score, then the subimage represents a non-face region. The SVM classifier module 310 compares the given 19×19 subimage window with selected training images (the support vectors) to compute a score. A score>0 represents a face, and a score<0 represents a non-face. This computation is designed to quickly reject windows which are definitely not faces. The full score is calculated only if the window contains a face, or closely resembles a face. A detail description of the cascade SVM classifier 310 will be discussed below.

The Isface module 306 combines the 19×19 subimage SVM classification results, step 412. The Isface module 306 can combine face and non-face regions, based on the classification results, to generate an image with the face location region 414.

The face detection module 106 continues until all subimage regions consisting of a 19×19 pixel windows in the image has been processed, step 410.

Cascade SVM Classifier

When using an SVM for classifying a new subimage, the subimage must be compared with each of the support vectors, in a kernel evaluation. Since typically there are hundreds of support vectors, this can be computationally expensive. To speed up the test-time performance of the SVM, the face detection module 106 first reduces the number of kernel evaluations performed for each of the subimages. A simple way to do this is to discard some of the support vectors. This will increase speed, but decrease accuracy. Each support vector has associated with it a coefficient, or alpha (a) value. Support vectors with very small alpha values have only a small affect on the classification of a test image. Consequently, the face detection module 106 can discard all support vectors with alphas below a certain threshold. This threshold is chosen such that the performance decrease on an independent test set of images is negligible.

A second method is to attempt classification of the test image before performing all of the kernel evaluations. FIG. 6 is a flowchart illustrating the steps involved in this cascade SVM classification method performed by the SVM classifier module 310. The idea is that many subimages are not faces, and many should be relatively easy to identify as such. Thus, the SVM classifier module 310 will try to discard non-face images using as few kernel evaluations as possible. The alpha values, the kernel to be evaluated and the threshold values for each stage have been determined during the training stage (described below). These values are stored in the data file in data storage 302, and the data file is accessible by the SVM classifier 310.

Given a new subimage 602, let $k_1, k_2, \ldots k_N$ be the result of evaluating the kernel function between the subimage and each of the N support vectors respectively, and $\alpha_1, \alpha_2, \ldots \alpha_N$ be the coefficients corresponding to each support vector. The standard SVM classification function is to indicate that a face has been found if $\alpha_1*k_1+\alpha_2*k_2+\ldots+\alpha_N*k_N>=b(1)$, where b is a threshold. The cascade SVM begins by looking only at $\alpha_1*k_1+\alpha_2*k_2>=b_1(2)$, step 604. This rule is significantly simpler than (1), and cannot hope to match its accuracy. Instead, by choosing a small enough threshold $b_1$ (minimizing the false negatives), (2) becomes a simple rule for quickly rejecting the obviously non-face images. If the test image satisfies (2) (i.e., it is above threshold #1), then the training module 302 applies a more complicated decision function $\alpha_1*k_1+\ldots+\alpha_4*k_4>=b_2$ (3), step 606. Again, the SVM classifier 310 optimizes $b_2$ to reject only non-face images, at the cost of allowing many false positives through to the next stage. The SVM classifier 310 continues to apply more complicated decision rules, each time increasing, e.g., doubling, the number of kernel evaluations included in the rule (e.g., step 608), classifying the image as a non-face 614 (and thus terminating the process) as soon as the test image fails to satisfy one of the decision rules.

Those skilled in the art will recognize that the step 604 in the SVM classifier process, as illustrated in FIG. 6, may consist of computing SVM score using any number of support vectors (e.g., the first three support vectors), and likewise, each consecutive step may use another number of support vectors (e.g., the first six support vectors in step 606).

Finally, if the subimage has satisfied all intermediary decision rules, and has now reached the point at which all support vectors must be considered, the SVM classifier 310 now applies the original decision function (1), hoping to classify the test image as accurately as possible, step 612. Note that satisfying this final rule, and all intermediary rules, is the only way for a test image to garner a positive (face) classification.

In its worst case, the method described above requires only a few additional comparison operations (the number of comparisons is logarithmic in the number of support vectors). However, in practice, the vast majority of the non-face images can be classified as such relatively early on in the cascade—many after only testing the simplest rule (2). Since the majority of images encountered do not contain a face, this leads to a significant overall decrease in computation required for classification.

Face Detection Training

In order to classify face and non-face regions, the decision surface for the SVM classifier 310 must first be trained using a set of positive examples (i.e., face images) and a set of negative examples (i.e., non-face images). Images of landscapes, trees, buildings, etc., are good sources of false positives.

One problem with SVM-based classifier is that it is time consuming to compute the score for each image because the number of support vectors can be very large. In the training phase, the detection module 106 sorts the support vectors based on their coefficients (a values). The support vectors with larger coefficients mean that they are important in determining whether a test image is a face or not. Such sorting process is useful in evaluating whether a test image is a face or not. If a test image is in fact not a face, then the SVM score should be low when computing with the support vectors with large coefficients. On the other hand, if the test image in fact is a face, then its SVM score should be above a threshold. And face detection module 106 can continue to evaluate this test image using the remaining support vectors. If all the SVM scores are above thresholds, then the detection module 106 classifies the test image as a face.

FIG. 4 illustrates the training process. As discussed above, training the face detection module 106 involves training the SVM using images of faces and non-faces. After training is completed, a data file is produced (not shown) and the file is used by the face detection module 106 for SVM classifier used to classify faces and non-faces. Training need only be performed once, although retraining is possible if the performance of the detector is unsatisfactory.

In the preferred embodiment, given a set of positive examples (face images) and negative examples (non-face images) 402, the face detection module 106 trains a SVM classifier with a third order polynomial kernel. In other embodiments, other order polynomial kernel function (e.g., a second degree polynomial kernel function) can be used. The set of face and non-face regions are assigned to classes +1 and −1 respectively.

In a preferred embodiment, the face detection module 106 trains the SVM using a set of 19×19 pixel subimages of face and non-face regions. The face detection module 106 trains a cascade SVM classifier with the subimages containing face and non-face regions, step 504. Training this cascade classifier involves choosing an order in which support vectors are to be added to the increasingly-complex decision rule, and choosing a threshold for each stage in the cascade. The order of the first four support vectors (the first two stages) is chosen using brute force. All pairs of support vectors are considered, and the ones able to reject the most non-face images from a training set, allowing a fixed number of false negatives (e.g. 0 or 0.1%), are selected, step 506. Support vectors with the smallest coefficients are less important in determining whether a test image is a face or not. Thus, these support vectors are discarded, step 508. At later levels of the cascade, brute force is no longer computationally feasible, so, instead a number of (e.g., 1000) random selections of support vectors are considered, and the best one is chosen, step 510. Once the ordering of support vectors is chosen, the choices of thresholds, b, are made based on a training set and an acceptable rate of false-negative classifications, step 514. When all support vectors have been selected 512, the final threshold is set to the value determined when training the SVM, step 516.

More detail on training SVM classifier is provided in E. Osuna, R. Freund, and F. Girosi, "Training support vector machines: an application to face detection," in Proceedings of the IEEE Computer Society Conference on Computer Vision and Pattern Recognition (CVPR), 1997, which is incorporated herein by reference.

Face Recognition

If the result of the Face detection module is that a face is detected, the present invention can proceed to utilize the face recognition module 108 to recognize the face. In alternate embodiments the face recognition module operates independently from the result of the face detection module. In the preferred embodiment the face recognition module 108 includes a training module and a test module. It is envisioned that the training module is executed in a non-real-time (offline) mode while the test module is executed in a run-time mode.

FIG. 7 is a flowchart illustrating the face recognition training procedure according to one embodiment of the present invention. The p resent invention captures images 702 of the face of various subjects that will be registered in the database. The present invention then uses a face detection algorithm 704 to detect face images. The face detection algorithm can be the algorithm described above. The present invention includes the optional step of having a person visually inspect 706 the images identified by the face detector to determine 707 whether the panel or window represents a face. If so, the present invention performs 708 a histogram equalization procedure and creates 709 virtual examples. The histogram equalization process 708 adjusts for variations in lighting between different users and can be performed before or after the multiple virtual images are created. In one embodiment the histogram equalization process 708 includes converting the images to grayscale and normalizing the image by, for example, subtracting the mean grayscale value of the face image and dividing each pixel by the standard deviation of multiple images in the database.

In one embodiment the virtual examples are face images that are shifted by one or more pixels at one or more scales to create 709 multiple virtual examples for each face in the database. The face images can also be rotated to create 709 virtual images to account for alignment differences. The virtual examples help alleviate alignment errors in subspace space algorithms, e.g., the Fisher Linear Discriminant. One technique for creating multiple virtual images is to (1) use a cropped image have a first size, e.g., 64 pixels by 64 pixels, then (2) sample five windows of 60×60 pixels, one in each of five positions, center, top left, top right, lower left, lower right, then (3) sample a 56×56 pixel window in each of 5 positions, (4) perform histogram equalization, and (5) normalize all of these 11 images to 19×19 pixel images.

The present invention then determines 710 the projection matrix using a subspace space algorithm. In one embodiment of the present invention the Fisher Linear Discriminant (FLD). Additional details about the FLD method are set forth in P. N. Belhumeur, J. P. Hespanha and D. J. Kriegman, "Eigenfaces vs. Fisherfaces: Recognition Using Class Specific Linear Projection," IEEE Trans. Pattern Analysis and Machine Intelligence, (19)7: 711-720, 1997, that is incorporated by reference herein in its entirety. In alternate embodiments of the present invention a Kernal Fisher Linear Discriminant (KFLD) algorithm can be used. Additional details regarding KFLD and FLD are set forth in U.S. patent application Ser. No. 10/201,429 filed on Jul. 22, 2002 which is incorporated by reference herein in its entirety.

To deal with the singularity problem of within-scatter matrix SW that is often encountered in pattern classification, in one embodiment of the present invention a multiple of the identity matrix may be added to the within-scatter matrix, i.e., $S_w + \epsilon I$ (where $\epsilon$ is a small number), according to one embodiment of the present invention. This also makes the eigenvalue problem numerically more stable. This eliminates the $W_{pca}$ term in equation five in: *Eigenfaces vs. Fisherfaces: Recognition Using Class Specific Linear Projection*, Belhumer et al, IEEE Transactions on Pattern Analysis and Machine Intelligence, Vol. 19, No. 7 (1997) which is incorporated by reference herein in its entirety. Additional details are set forth in U.S. patent application Ser. No. 10/621,872 that is referenced above.

FIG. 8 is a flow chart illustrating a face recognition method according to one embodiment of the present invention. An image is received 802 as captured by, for example, a video camera. The face detection procedure described above is then performed 804 to identify the location of the face within the image. The image is cropped to create 805 the test image. Then the test image is converted to grayscale and normalized 805 by subtracting the mean face image, and dividing each pixel by the standard deviation, as described above. The test image is then projected 806 to a lower-dimensional space using a learned projection matrix identified in the training process, described above. The present invention then identifies 808 the cluster having a cluster center with the minimum distance to the projected sample. Additional details regarding these steps are set forth in Belhumer et al, and U.S. patent application Ser. No. 10/201,429 that are referenced above. In one embodiment, the Fisher coordinates are calculated for the test image and the are compared with the mean Fisher coordinates for each person in the database. Previously, the Fisher coordinates are determined for each face image in the database. For each person, the mean of the Fisher coordinates, over all images of that person, is determined. Thereafter, the Fisher coordinates of the test image are compared with the mean Fisher coordinates for each person in the database. The test image is classified as belonging to the person who's mean Fisher coordinates are closest, e.g., in Euclidean distance, to the test image.

Alternatively, the present invention can utilize a temporal voting technique that utilizes the identity determined for previous frames. In one example, the determined identities in the last five video frames are used when determining the identify of the current test image. In one embodiment the temporal voting is performed by using the majority wins strategy. That is, the identity is determined based on the maximum number of an identity being determined in the last five video frames.

Upon reading this disclosure, those skilled in the art will appreciate still alternative systems and methods for at-speed bit fail mapping with the disclosed principles of the present invention. Thus, while particular embodiments and applications of the present invention have been illustrated and described, it is to be understood that the invention is not limited to the precise construction and components disclosed herein and that various modifications, changes and variations, which will be apparent to those skilled in the art, may be made in the arrangement, operation and details of the method and apparatus of the present invention disclosed herein without departing from the spirit and scope of the invention as defined in the appended claims.

We claim:

1. A method for using Support Vector Machine comprising:
   receiving training data for a cascade SVM-based classifier, wherein the training data comprises:
      a first plurality of support vectors and a first threshold value for the first plurality of support vectors; and
      a second plurality of support vectors and a second threshold for the second plurality of support vectors, wherein the second plurality of support vectors includes the first plurality of support vectors and at least one additional support vector;
   receiving an input data;
   generating a first SVM score for the input data using the first plurality of support vectors;
   comparing the first SVM score to the first threshold to determine a first classification of the input data; and
   responsive to the first classification of the input data being a positive classification, generating a second SVM score for the input data using the second plurality of support vectors; and
   comparing the second SVM score to the second threshold to determine a second classification of the input data.

2. The method of claim 1, farther comprising generating an output data, wherein the input data comprises an image, and wherein the output data indicates whether the input data is a face image or a non-face image based on the second classification.

3. The method of claim 2, wherein responsive to the first classification being a negative classification, determining that the input data is a non-face image.

4. The method of claim 3, further comprising identifying a face in the input data using a face recognition responsive to the output data indicating that the input data is a face image.

5. The method of claim 4, wherein identifying the face comprises projecting the input data to a low dimensional space using a learned project matrix; determining a cluster center with a minimum distance to the projected input data; and returning an identity of the cluster center.

6. The method of claim 5, wherein the learned projected matrix is computed using Fisher Linear Discriminant.

7. The method of claim 1, wherein the first plurality of support vectors comprises a first two support vectors, wherein the first SVM score is generated from the first two support vectors.

8. The method of claim 1, wherein the first classification of the input data comprises the positive classification if the first SVM score is greater than the first threshold value.

9. The method of claim 1, wherein the first plurality of support vectors comprises a first four support vectors, wherein the first SVM score is generated from the first four support vectors.

10. The method of claim 1, wherein the first plurality of support vectors comprises a first eight support vectors, wherein the first SVM score is generated from the first eight support vectors.

11. The method of claim 1, wherein the second plurality of support vectors comprises all support vectors, wherein the second SVM score is generated from all the support vectors.

12. The method of claim 1, wherein the first classification comprises a negative classification if the first SVM score is less than the first threshold value.

13. The method of claim 1, wherein the training data is generated by steps including:
receiving a training set, wherein the training set comprises a set of positive examples and a set of negative examples;
generating a plurality of support vectors and a plurality of support vector coefficients from the training set;
selecting a subset of support vectors from the plurality of support vectors; the subset comprising support vectors capable of rejecting a negative example; and determining a threshold value for the subset of support vectors.

14. The method of claim 13 further comprising discarding support vectors with small coefficients.

15. The method of claim 1, wherein the input data is a digital image.

16. The method of claim 1 wherein the SVM is used for face detection.

17. The method of claim 1, wherein the input data comprises a 19×19 pixel subimage.

18. The method of claim 1, further comprising applying histogram equalization to the input data.

19. A system for using Support Vector Machine comprising:
training data receiving means for receiving training data for a cascade SVM-based classifier, wherein the training data comprises:
a first plurality of support vectors and a first threshold value for the first plurality of support vectors; and
a second plurality of support vectors and a second threshold for the second plurality of support vectors, wherein the second plurality of support vectors includes the first plurality of support vectors and at least one additional support vector;
input data receiving means for receiving an input data;
first SVM scoring means for generating a SVM score for the input data using the first plurality of support vectors;
first comparing means for comparing the first SVM score to the first threshold to determine a first classification of the input data;
second SVM scoring means for generating a second SVM score for the input data using the second plurality of support vectors responsive to the first classification of the input data being a positive classification; and
second comparing means for comparing the second SVM score to the second threshold to determine a second classification of the input data.

20. The system of claim 19, further comprising output means for generating an output data, wherein the input data comprises an image, and wherein the output data indicates whether the input data comprises a face image or a non-face image based on the second classification.

21. The system of claim 20, wherein the first comparing means further determines that the input data is a non-face image responsive to the first classification being a negative classification.

22. The system of claim 21, farther comprising face recognition means for identifying a face in the input data using a face recognition responsive to the output data indicating that the input data is a face image.

23. The system of claim 22, wherein said face recognition means includes:
projection means for projecting the input data to a low dimensional space using a learned project matrix; and
cluster center means for determining a cluster center with a minimum distance to the projected input data.

24. The system of claim 23, wherein the learned projected matrix is computed using Fisher Linear Discriminant.

25. The system of claim 19, wherein the first plurality of support vectors comprises a first two support vectors, wherein the first SVM score is generated from the first two support vectors.

26. The system of claim 19, wherein the first classification of the input data comprises the positive classification if the first SVM score is greater than the first threshold value.

27. The system of claim 19, wherein the first plurality of support vectors comprises a first four support vectors, wherein the first SVM score is generated from the first four support vectors.

28. The system of claim 19, wherein the first plurality of support vectors comprises a first eight support vectors, wherein the first SVM score is generated from the first eight support vectors.

29. The system of claim 19, wherein the second plurality of support vectors comprises all support vectors, wherein the second SVM score is generated from all the support vectors.

30. The system of claim 19, wherein the first classification comprises a negative classification if the first SVM score is less than the first threshold value.

31. The system of claim 19, wherein the training data is generated by training means comprising:
training set receiving means for receiving a training set, wherein the training set comprises a set of positive examples and a set of negative examples;
training SV means for generating a plurality of support vectors and a plurality of support vector coefficients from the training set;
subset selection means for selecting a subset of support vectors from the plurality of support vectors; the subset comprising support vectors capable of rejecting a negative example; and
threshold determining means for determining a threshold value for the subset of support vectors.

32. The system of claim 31, further comprising discarding means for discarding support vectors with small coefficients.

33. The system of claim 19, wherein the input data is a digital image.

34. The system of claim 19, wherein the SVM is used for face detection.

35. The system of claim 19, wherein the input data comprises a 19×19 pixel subimage.

36. The system of claim 19, further comprising histogram equalization means for applying histogram equalization to the input data.

* * * * *

UNITED STATES PATENT AND TRADEMARK OFFICE
CERTIFICATE OF CORRECTION

| | | |
|---|---|---|
| PATENT NO. | : 7,430,315 B2 | Page 1 of 1 |
| APPLICATION NO. | : 10/858930 | |
| DATED | : September 30, 2008 | |
| INVENTOR(S) | : Ming-Hsuan Yang et al. | |

It is certified that error appears in the above-identified patent and that said Letters Patent is hereby corrected as shown below:

Column 10, Claim 2, first line please delete the word "farther" and insert --further--.

Column 12, Claim 22, first line please delete the word "farther" and insert --further--.

Signed and Sealed this

Tenth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,430,315 B2
APPLICATION NO. : 10/858930
DATED : September 30, 2008
INVENTOR(S) : Ming-Hsuan Yang et al.

It is certified that error appears in the above-identified patent and that said Letters Patent is hereby corrected as shown below:

Column 10, Claim 2, line 39, please delete the word "farther" and insert --further--.

Column 12, Claim 22, line 5, please delete the word "farther" and insert --further--.

This certificate supersedes the Certificate of Correction issued March 10, 2009.

Signed and Sealed this

Thirty-first Day of March, 2009

JOHN DOLL
*Acting Director of the United States Patent and Trademark Office*